United States Patent

[11] 3,540,363

[72] Inventor Shigeo Ono
 Yokohama-shi, Japan
[21] Appl. No. 699,820
[22] Filed Jan. 23, 1968
[45] Patented Nov. 17, 1970
[73] Assignee Nippon Kogaku K.K
 Tokyo, Japan
 a corporation of Japan
[32] Priority Jan. 27, 1967
[33] Japan
[31] 42/7,071

[54] EXPOSURE METER ARRANGEMENT FOR A SINGLE LENS REFLEX CAMERA HAVING INTERCHANGEABLE LENSES
2 Claims, 8 Drawing Figs.

[52] U.S. Cl. ............................................. 95/42
[51] Int. Cl. ....................................... G03b 19/12
[50] Field of Search ................................. 95/42

[56] References Cited
UNITED STATES PATENTS

| | | | |
|---|---|---|---|
| 3,127,809 | 4/1964 | Denk | 95/42 |
| 3,272,105 | 9/1966 | Manderfeld | 95/42 |
| 3,332,330 | 7/1967 | Broschke et al. | 95/42 |
| 3,332,331 | 7/1967 | Mandler | 95/42 |
| 3,429,246 | 2/1969 | Ebertz | 95/42 |
| 3,446,126 | 5/1969 | Leitz | 95/42 |

Primary Examiner—John M. Horan
Assistant Examiner—Richard M. Sheer
Attorney—Anton J. Wille ABSTRACT: A relay optical system for an exposure meter built into a single lens reflex camera having interchangeable objective lenses. The relay optical system forms a conjugate image of the photosensitive surface of the exposure meter intermediate the exit pupil of any one of the interchangeable objective lenses thereby eliminating all interference by exit pupil size or position when lenses are interchanged. A stop is provided at the image plane within the relay optical system for restricting that portion of the object to be measured.

EXPOSURE METER ARRANGEMENT FOR A SINGLE LENS REFLEX CAMERA HAVING INTERCHANGEABLE LENSES

In single lens reflex cameras, proposals of various kinds have been made with respect to the position of the photosensitive element of an exposure meter for measuring the intensity of light passing through a camera lens, particularly in single lens reflex cameras having interchangeable lenses. These proposals have several drawbacks.

One of the drawbacks is that a portion of the objective image to be measured cannot be correctly restricted. Specifically, when the photosensitive element is not placed at a position conjugate with the focussing surface, fringe fog is induced each time the position or size of the exit pupil of an interchangeable lens is changed, thereby changing the objective image portion to be measured. Thus the sensitivity of an exposure meter is changed, and it is inconvenient for the photographer to make the necessary calculations and adjustments each time he changes lenses.

Another drawback is that the open "f" numbers of interchangeable lenses are usually different so that the sensitivity of an exposure meter is affected. In a single lens reflex camera, it is desirable to measure an exposure by opening the lens because of the brightness of the finder. An inconvenient adjustment of the exposure meter sensitivity is thus required almost every time a lens is interchanged.

In accordance with the present invention, these drawbacks are eliminated by providing in the viewfinder of the single lens reflex camera, a convergent optical system and a photosensitive element whereby the conjugate image of the photosensitive surface of the photosensitive element is intermediate the exit pupil of any one of the interchangeable lenses, the photosensitive surface and a portion of the objective image to be measured being conjugate.

The present invention will be described more in detail with respect to the embodiments shown in the drawing, in which.

Figure 1:
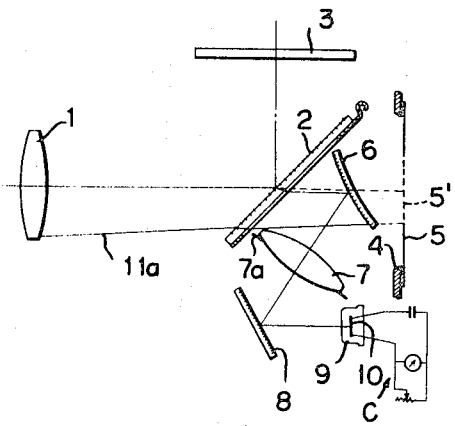
FIG. 1 shows a schematic cross-sectional view of the essential portions a single lens reflex camera viewfinder incorporating a first embodiment of the present invention.
Figure 2:
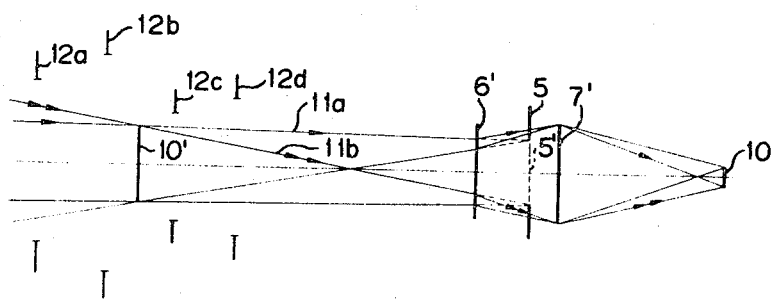
FIG. 2 shows light paths for illustrating the first embodiment.
Figure 5:
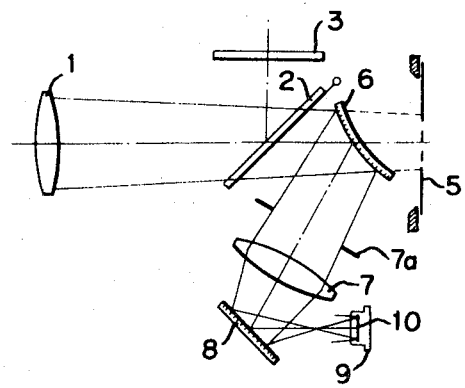
Figure 6:
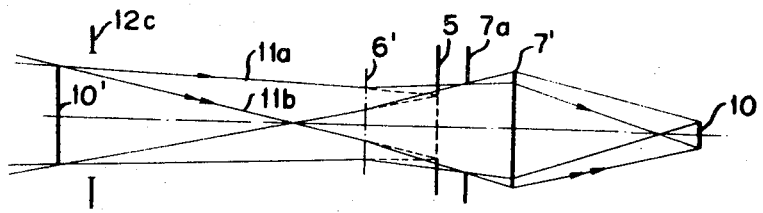
Figure 7:
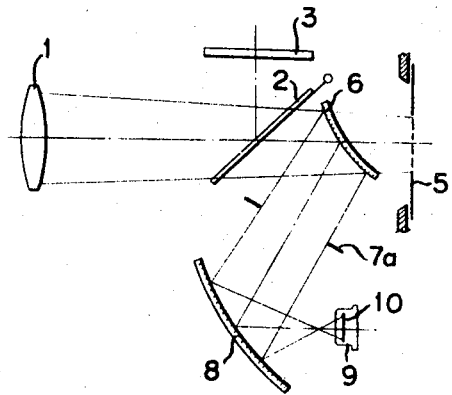
Figure 8:
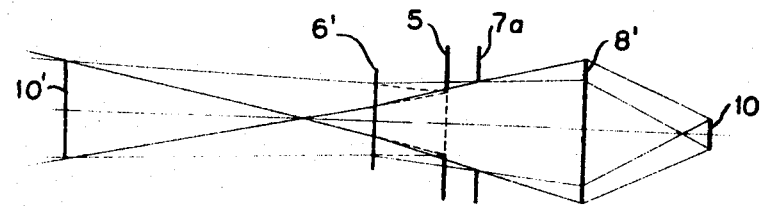

FIGS. 5 and 6 show a third embodiment in the same way as in FIGS. 1 and 2, respectively; and FIGS. 7 and 8 show a fourth embodiment in the same way as in FIGS. 1 and 2, respectively.

In FIG. 1, 1 is a camera lens, 2 is a reflecting mirror composing the finder of a single lens reflex camera and is made semitransparent or partially transparent to divide the finder light and exposure meter light rays, respectively, 3 is a focussing plate, 4 is an image frame, 5 is film, 6 is a totally reflecting convex mirror, 7 is a relay lens and is provided so that the positions of the film and the diaphragm 7a of the lens 7 are respectively conjugate with a camera lens 1. The position of the convex mirror 6 and the curvature thereof are determined so that the lens 7 may not interfere with the light flux 11a arriving at the objective image portion 5' of the film to be measured from the camera lens 1; 8 is a reflecting mirror, 9 is a photosensitive element of an exposure meter connected into the usual electrical circuit C, and 10 is the position of the photosensitive surface of the element 9.

FIG. 2 shows the development of the above given structure, in which 6' is a convex mirror; 7' is a relay lens; 10' is a conjugate image of the photosensitive surface 10. The size of the light flux projected onto the photosensitive surface 10 is determined by the light rays 11a and 11b. When the size of the conjugate image 10' is determined so as not to be cut by the exit pupils 12a, 12b, 12c, and 12d of the various interchangeable lenses, there is no change in the sensitivity of the exposure meter caused by the difference of the maximum apertures of the lenses. The compensation for the change of the maximum aperture, which was necessary in accordance with the conventional system, is not required in the arrangement herein described.

FIGS. 1 and 2 show the first embodiment of the present invention, which may be variously modified according to the structure of the camera.

Figure 3:
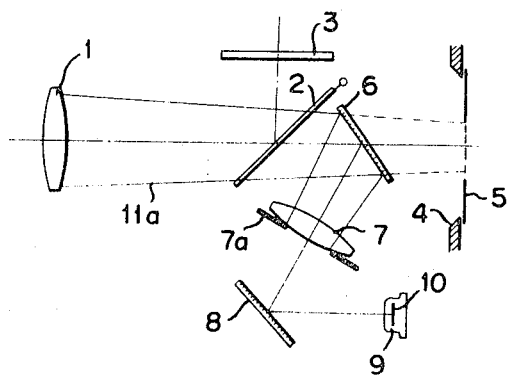
FIGS. 3 and 4 show a second embodiment in the same way as in FIGS. 1 and 2, respectively.
Figure 4:
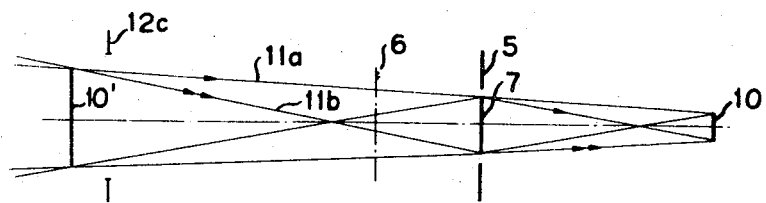

FIGS. 3 and 4 show a second embodiment of the present invention in the same way as in FIGS. 1 and 2 which illustrates the first embodiment, and the same numerical numbers in FIGS. 3 and 4 refer to the same elements in FIGS. 1 and 2. When the distance between the reflecting mirror 2 and the film 5 is large, the convex mirror 6 in the first embodiment can be replaced by a plane mirror 6. In this case as shown in FIG. 4, the distance between the plane mirror 6 and the film 5 and between the plane mirror 6 and the diaphragm 7a are made equal.

FIGS. 5 and 6 show a third embodiment of the present invention in the same way as in FIGS. 1 and 2. In the third embodiment, the convex mirror 6 is used and an appropriate diaphragm 7a is placed on the conjugate surface of the film 5, but the lens 7 is placed behind the diaphragm.

FIGS. 7 and 8 show a fourth embodiment, in which a concave mirror 8 is used as a convergent optical system in place of the lens 7.

Not shown in the drawing, since it is self-evident, but it is possible to control the portion of the objective image to be measured with the effective diameter (or fringe) of the lens 7 in place of the diaphragm 7a, and moreover, the reflecting mirror 8 may be omitted.

Furthermore, the convex mirror 6 and the relay lens 7 can be moved out of the light path when an exposure is made or the relay lens 7 may be fixed externally of the camera body in a suitable manner.

As has been described above, when this invention is employed, the light flux arriving at the photosensitive element is not interfered with by the exit pupils of the various interchangeable lenses. The sensitivity of the exposure becomes independent of the open "f" numbers of the interchangeable lenses, and the objective image portion to be measured is restricted to the conjugate portion independent of the position and the size of the exit pupil of any camera lens used.

I claim:

1. A single lens reflex camera provided with interchangeable objective lenses and including an exposure meter for measuring light from an object passing through the objective lens, comprising:

a viewfinder;

a pivotably mounted partly transparent mirror for reflecting a portion of the light passing through the objective lens into said viewfinder;

a relay optical system arranged behind said mirror;

a stop provided at the image plane within said relay optical system for restricting that portion of the object to be measured; and a photosensitive element secured within the camera and arranged to receive said image light through said stop, the conjugate image of said photosensitive element being formed by said relay optical system at a position substantially intermediate the different exit pupils of each of the different interchangeable objective lenses.

2. A single lens reflex camera according to claim 1, in which said stop is the effective diameter of an element of said relay optical system.